Feb. 11, 1958   A. E. STONE   2,823,285
CONTROL APPARATUS
Filed June 7, 1954
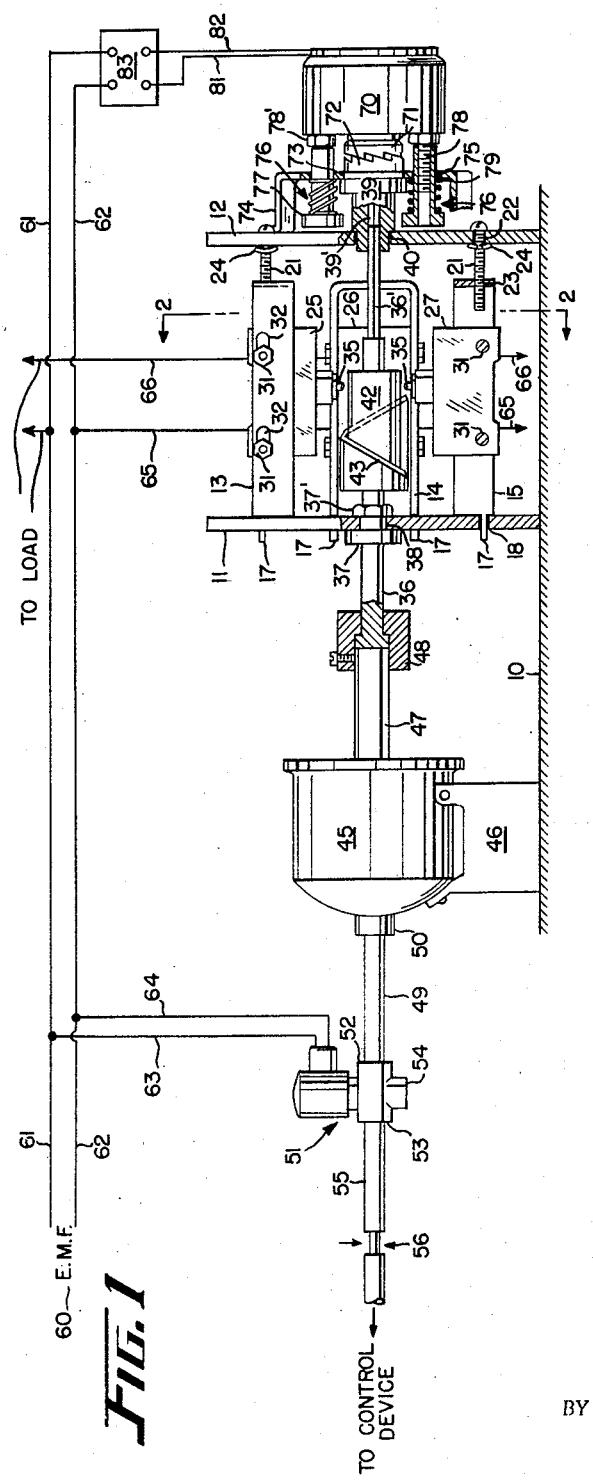
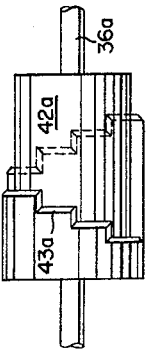
FIG. 3
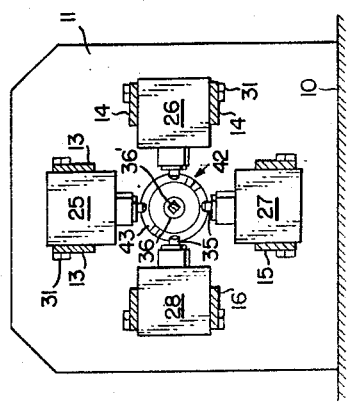
FIG. 2
FIG. 1
INVENTOR
ALBERT E. STONE
BY George H. Fisher
ATTORNEY

United States Patent Office

2,823,285
Patented Feb. 11, 1958

2,823,285

CONTROL APPARATUS

Albert E. Stone, La Grange, Ill., assignor to Minneapolis-Honeywell Regulator Company, Minneapolis, Minn., a corporation of Delaware Application June 7, 1954, Serial No. 435,023

12 Claims. (Cl. 200—153)

This invention pertains generally to devices known as step controllers and sequence alternators. Step controllers as used in industry take various configurations according to the individual applications in which they are used and sequence alternation is generally effected by complex circuit arrangements. In the preferred embodiment of this invention, a step controller is provided wherein a helical cam member is axially positioned in a support relative to a plurality of switch actuating members, also secured to the support so that axial movement of the cam relative to the switches causes a sequential operation of the switch actuating members. Further, in this perferred embodiment, rotation of the cam member relative to the switch actuating members by predetermined amounts causes different switch actuating members to be operated and thus alters the sequence of switch operation.

It is thus an object of this invention to provide a step controller comprising in part a helical cam member with switch actuating members so positioned adjacent to the cam member that relative axial displacement between the cam member and the actuating members effects sequential operative engagement of the cam member and the actuating members.

Another object of this invention is to provide a step controller comprising a helical cam member and a plurality of switch actuating members so positioned adjacent said cam member that relative rotation between said cam member and said actuating members effects a selective engagement and disengagement of said actuating members by said cam member.

It is an additional object to provide an improved step controller having features such as sequence alternation, automatic recycling upon power failure, simplicity, compactness and the like.

The above and other objects of the invention, including constructional details and operation of step controllers embodying my invention, will be set forth more fully in and become apparent from a reading of the following specification and appended claims, in conjunction with the accompanying drawing in which:

Figure 1 is a side elevational view in somewhat schematic form and partly in section of a step controller embodying the teachings of my invention;

Figure 2 is a view in section of the apparatus shown in Figure 1 as seen along section lines 2—2; and Figure 3 is a showing of a modified type of cam construction usable in the apparatus shown in Figures 1 and 2.

Referring to Figure 1, a base 10 has mounted thereon a pair of supporting plates 11 and 12 spaced apart from one another and retained in this position by suitable attaching means, not shown. A plurality of switch holding U-shaped brackets 13, 14, 15 and 16 are positioned between and held by end plates 11 and 12 in a cylindrical fashion. Each of the U-shaped brackets has a lug portion 17 extending from each of its legs, lugs 17 fitting into suitable apertures 18 provided in end plate 11. Screw members 21, journalled in suitable apertures 22 in end plate 12 extend inwardly thereof and are screwed into threaded holes 23 in the bight portion of the U-shaped brackets 13–16 and support said bight portions. Snap washers 24 fitting in suitable grooves in screws 21 allow rotation of the screws 21 with respect to end plate 12 but prevent relative axial motion therebetween. Lug portions 17 on the brackets slidably fit in holes 18 and thus allow the brackets to move axially in accordance to rotation of screw members 21, hence a means for adjusting the axial position of the brackets with respect to end plates 11 and 12 is provided.

A plurality of switches 25, 26, 27 and 28 are secured within the bifurcated portions of bracket members 13, 14, 15 and 16 respectively by suitable screw means 31. Elongated slots 32 are provided in the bracket members so as to provide a means of varying the axial position of the switch members with respect to the bracket members. The slot means 32 provide a coarse adjustment of the switches with respect to end plates 11 and 12 while screw members 21 provide a fine adjustment therebetween. Obviously, switch members 25 through 28 may be of any suitable sort and the invention should not be limited to the type shown in the drawings. Where electrical switches are desired, they well may be of the type disclosed in the McGall Patent 1,960,020. Each of switches 25 through 28 has a switch actuating pin 35 projecting radially inwardly, said pins 35 terminating concentrically with respect to a shaft 36 which is journalled in a bushing 37 secured by a nut 37' in a suitable aperture 38 in end plate 11 and in a bushing 39 having a square bore 39' therein positioned in an aperture 40 in end plate 12. The right end of shaft 36 as viewed in Figure 1 has a square portion 36' which cooperates with the square bore 39' of bushing 39. This arrangement allows relative axial displacement between shaft 36 and bushing 39 but precludes relative rotation therebetween. The journalling of shaft 36 in bushing 37 allows both relative axial and rotational displacement therebetween. A cam member 42 having a helical bevelled cam surface 43 thereon is fastened to shaft member 36 by a suitable means such as a set screw, not shown. As is seen in Figure 1, the bevel on cam surface 43 is such that it will cooperate with and actuate switch pins 35 by either axial or rotational movement of cam member 42.

Shaft 36 is adapted to be axially displaced to the right from the position shown in Figure 1 by a motor 45 fastened to base 10 by suitable support means 46. Motor 45 is shown to be pneumatically operated and may be of the type shown in Hermanson Patent 2,372,273, but it will be appreciated that the teaching of the invention would apply to motors of other types, the main requirement being that shaft 36 be axially displaced variable amounts by this means, preferably by an amount proportional to the pressure applied to said motor. An output shaft 47 of motor 45 is linked to shaft 36 by a suitable connector 48 which transmits axial movement of shaft 47 to shaft 36 but which allows relative rotation therebetween.

A fluid conduit member 49 is connected at one of its ends to an inlet fitting 50 on motor 45 and is connected at its other end to the branch port 52 of a three-way solenoid valve 51 which well may be of the type shown in Fox Patent 2,226,761 although valves of other types would come within the scope of the invention. Solenoid valve 51 also has an inlet or supply port 53 and a discharge or exhaust port 54. Fluid under pressure from a suitable source, not shown, and controlled by a control device, such as a pneumatic thermostat, not shown, is applied to valve 51 through a branch conduit 55 intermediate of which is a restriction 56 which serves the function of controlling the rate at which fluid can be applied to motor 45. Valve 51 is adapted to be energized from a source of electromotive force 60 through main leads 61 and 62 and connection leads 63 and 64.

Each of switches 25 through 28 has branch leads 65 and 66 interconnected between lines 61 and 62 and load devices, not shown, so that upon actuation of the pin members 35 by cam member 42, energization of the load devices, not shown, is controlled. Inasmuch as cam surface 43 has a helical configuration, it follows that upon axial displacement of shaft 36 and, of course, cam member 42, cam surface 43 will come into successive engagement with pin members 35 of the switches in accordance to the relative angular and axial positions of the switches with respect to the cam member. The effect of this arrangement is to provide step control of the load devices, not shown, so that the load devices are selectively effected in a predetermined sequence. Further, since motor 45 is preferably of the type wherein its displacement is proportional to the pressure applied thereto, it follows that cam member 42, will be displaced to the right from the position shown in Figure 1, and operate switches in accordance with the displacement, depending on the branch pressure applied to the motor.

In addition to means for longitudinally moving cam member 42, means are also provided for rotating cam member 42 with respect to switches 25 through 28. This may be accomplished by a suitable motor 70 of the ratchet or step-by-step type and which may be of the type shown in the Leland Patent 2,496,880 but, of course, any other suitable motor may be used. Motor 70 has a ratchet face type output shaft 71 which cooperates with a similar ratchet face 72 on the right end of bushing 39, this portion of bushing 39 extending through a central aperture 73 in a motor mounting bracket 74, the ends of which are secured to end plate 12 by suitable means, not shown. A pair of hollow internally threaded bushings 76 having head portions 77 thereon extend through still further apertures 75 in bracket member 74 and are screwed on the ends of stud members 78 which in turn are fastened to the housing of motor 70. Bushings 76 are adjustably held in position on stud members 78 by jam nuts 78'. Spring members 79 positioned between the head portions 77 of bushings 76 and the inner surface of bracket 74 tend to bias motor 70 with its ratchet face 71 into engagement with the ratchet surface 72 on bushing 39.

Motor 70, when energized, is adapted to rotate bushing 39 and shaft 36 by reason of the cooperating square portions 39' and 36' and hence rotate cam member 42 a predetermined angular amount per each energization. In the embodiment of the invention shown wherein four switches 25 through 28 are shown, motor 70 should be arranged to rotate cam member 42 ninety degrees for each energization thereof. It is obvious that the teaching of the invention may be extended so that there may be a greater or lesser number of switches thereon and accordingly motor 70 would then be arranged to rotate cam member 42 a greater or lesser angular amount per each energization thereof. It should be understood that the invention contemplates rotating the cam member with respect to the switches by amounts other than the angular distance between adjacent switches. The energization of motor 70 is effected through a pair of leads 81 and 82 which are connected to the output terminals of a time and/or a manual switch 83, the input terminals of which are connected to the main connection leads 61 and 62. Device 83 may also include rectifier and filter means if desired according to the type of motor used. Motor 70 then may be energized in accordance to a preselected time schedule or may be manually energized according to the needs of the particular application of the step controller. It will be appreciated that the motor 70 per se is precluded from rotating with respect to end plate 12 inasmuch as it is connected to bracket member 74 through bushing members 76. Thus energization of the motor causes output shaft 71 to drive into engagement with the toothed portion 72 of bushing member 39 which, as indicated above, is journalled in end plate 12 as well as bracket member 74.

Operation

During intervals when solenoid valve 51 is deenergized, conduit member 49 is in communication with exhaust port 54 of valve 51 and hence motor 45 has no branch pressure applied thereto. Consequently, due to biasing means, not shown, within motor 45, shaft member 47 and 36 will be displaced to the left position as shown in Figure 1. Application of electromotive force 60 to leads 61 and 62 and hence leads 63 and 64 energizes valve 51 which seals off exhaust port 54 and places conduit 49 in communication with the branch conduit 55. Hence, motor 45, with fluid under sufficient pressure applied thereto, will cause an axial displacement of shaft 47 and shaft 36 to the right in proportion to the amount of pressure applied to the motor and at a rate dependent on restriction 56, said displacement of course also causing cam member 42 to be displaced axially to the right with respect to actuating pins 35 on switches 25 through 28 so that said pins will be sequentially engaged by bevelled helical cam surface 43 and thus the load devices connected to the switches will be sequentially energized. Motor member 70 may be energized as desired, either while cam member 42 is in the position shown in Figure 1 or while it is at any other condition of axial displacement toward the right. Rotation of cam member by motor member 70 while the cam member is in the left-hand position as shown in Figure 1 will effect no immediate result but will change the sequence of switching upon the next axial displacement of cam member 42. Rotation of cam member 42 by motor 70 while the cam motor is in an intermediate position will effect an immediate switching action inasmuch as the helical cam surface 43 will selectively engage and disengage the various actuating pins 35.

In Figure 3 is shown an alternate form of the cam member usable in the apparatus shown in Figure 1. As before, a shaft member 36a is adapted to be axially displaced as well as rotated by suitable motor means. The cam member 42a may be secured to shaft 36a by means not shown and a stepped helical bevelled cam surface 43a thereon is provided so that upon axial displacement of the shaft and the cam member, the respective faces of surface 43a will come into successive contact with the actuating members with which it cooperates. By having cam surface 43a stepped about the periphery of cam member 42a, in an increasing fashion, it follows that relative rotation between cam member 42a and the actuating means with which it cooperates, will effect a change in the sequence of contacting. It will be observed that eight steps have been provided in cam surface 43a in Figure 3 which is a ratio of two steps per switch in the device as shown. This ratio is one of choice according to the particular application and the invention should not be limited to this particular configuration or ratio.

The apparatus described above is fail safe in event of power failure. When leads 61 and 62 become deenergized, solenoid valve 51 will move to its deenergized position which allows conduit 49 to be in communication with the exhaust port 54. Thus no branch line fluid pressure is applied to motor 45 and its internal biasing means, not shown, acts to displace shafts 47 and 36 and hence cam member 42 to the position shown in Figure 1. Thus the load circuits controlled by switches 25 through 28 will be deenergized. When the power is restored to leads 61 and 62, solenoid valve will allow fluid pressure to be applied to motor 45 and sequential energization of the load devices will result. Thus, if the several load energizing switches are connected to control motors that draw high starting current only one motor will be started at a time and the danger of overloading the line is avoided. It should be understood, however, that this fail safe feature is optional, and the invention should be interpreted so as to include arrangements that do not fail safe as well as arrangements that do.

While I have shown and described specific embodiments of this invention, further modifications and improvements will occur to those skilled in the art. I desire it to be understood, therefore, that this invention is not limited to the particular form shown and I intend in the appended claims to cover all modifications which do not depart from the spirit and scope of this invention.

What I claim is:

1. Apparatus of the class described comprising a support having a pair of end plates spaced apart; a plurality of U-shaped brackets on said housing arranged parallel to one another and in a cylindrical fashion about an axis; a shaft journalled in said end plates and extending parallel to said brackets along said axis; a member having a helical cam surface thereon secured to said shaft; switch means secured to said brackets; said switch means including switch operating pins each extending radially inwardly from said brackets and terminating concentrically with said shaft; means for displacing said shaft and said cam member along said axis so that said pins are successively engaged by said cam surface; and means for rotating said shaft and said cam member about said axis an amount proportional to the number of said brackets.

2. Apparatus of the class described comprising a support having a pair of end plates spaced apart; a plurality of U-shaped brackets on said housing arranged parallel to one another and in a cylindrical fashion about an axis; a shaft journalled in said end plates and extending parallel to said brackets along said axis; a member having a helical cam surface thereon secured to said shaft; switch means secured to said brackets; said switch means including switch operating means each extending inwardly from said brackets and terminating a common distance from said shaft; and means for displacing said shaft and said cam member along said axis so that said switch operating means are sequentially engaged by said cam member.

3. Apparatus of the class described comprising a support having a pair of end plates spaced apart; a plurality of brackets on said housing arranged in a cylindrical fashion about an axis; a shaft journalled along said axis by said end plates; a member having a cam surface thereon secured to said shaft; switch means secured to said brackets, said switch means including switch operating means each extending from said brackets and terminating a common distance from said shaft; means for displacing said shaft and said cam member along said axis so that said switch operating and means are successively engaged by said cam member; means for effecting relative rotation between said shaft and said cam member about said axis so as to alter the sequence of engagement of said operating means by said cam member.

4. Apparatus of the class described comprising a base having support means attached thereto; a plurality of switches positioned by said support means and arranged in a circular fashion about an axis; a shaft journalled in said support means and extending adjacent to said switches along said axis; helical cam means on said shaft; said switches including switch operating means extending from said switches and terminating concentrically with said shaft; means for displacing said cam means along said axis so that said switch operating means are successively engaged by said cam means; and means for rotating said cam means about said axis so as to alter the sequence of engagement of said operating means by said cam member.

5. Apparatus of the class described comprising a rotatable and axially displaceable shaft, a plurality of actuating members adjacent to said shaft, means for producing relative axial displacement between said shaft and said actuating members, means on said shaft sequentially engaging said actuating members during said displacement, and means for producing a pre-selected amount of relative rotation between said shaft and said actuating members so as to alter the sequence of engagement of said actuating members by said means on said shaft during said axial displacement.

6. Apparatus of the class described comprising a support, a cam member movable relative to said support, means for producing relative axial displacement between said cam member and said support, a plurality of actuating members on said support, means on said member sequentially engaging said actuating members during said axial displacement, and means for effecting a pre-selected amount of relative rotation between said cam member and said actuating members so as to alter the sequence of engagement of said actuating members by said cam member during said axial displacement.

7. Apparatus of the class described comprising a support, a helical cam member on said support, means for effecting relative displacement between said support and said cam member along an axis, and a plurality of actuating members on said support positioned about said axis so as to be sequentially contacted by said cam member during said displacement.

8. Apparatus of the class described comprising a support, a cam member on said support, means for effecting relative axial displacement between said support and said cam member, a plurality of actuating members on said support positioned so as to be sequentially contacted by said cam member during said displacement, and means for effecting relative rotation between said actuating members and said cam member so as to vary the sequence of contact of said actuating members by said cam member during said axial displacement.

9. Apparatus of the class described comprising a support, helical cam means on said support, a plurality of actuating members on said support positioned concentrically with respect to said cam means, means for providing relative axial displacement between said members and said cam means so that said cam means successively engages said members, and means for providing relative rotation between said members and said cam means so as to vary the sequence of engagement of said members by said cam means upon said axial displacement.

10. A step controller comprising, a plurality of control devices having operating means angularly spaced about an axis and equidistant therefrom, said operating means being disposed substantially in a plane transverse to the axis, a member having a surface thereon adapted to engage said operating means of said control devices sequentially on translation thereof along the axis, and said member being rotatable about the axis to determine the sequence in which said operating means are engaged by said surface on such translation of said member.

11. A step controller comprising, a plurality of control devices having operating means angularly spaced about an axis and equidistant therefrom, said operating means being disposed substantially in a plane transverse to the axis, a member having a helical cam surface thereon adapted to engage said operating means of said control devices sequentially on translation thereof along the axis, and said member being rotatable about the axis to determine the sequence in which said operating means are engaged by said cam surface on such translation of said member.

12. A step controller comprising, a plurality of control devices having operating means angularly spaced about an axis and equidistant therefrom, said operating means being disposed substantially in a plane transverse to the axis, a member having a surface cylindrical about the aforementioned axis, said member being translatable between a first position in which said cylindrical surface engages none of said operating means and a second position in which said cylindrical surface engages all of said operating means, said cylindrical surface terminating axially at a cam surface on said member shaped to provide sequential engagement of said operating means on translation of said member from first to second positions, and said member being rotatable about the axis to determine the sequence in which said operating means are engaged by said cylindrical surface on translation of said member from first to second positions.

References Cited in the file of this patent

UNITED STATES PATENTS

| | | |
|---|---|---|
| 2,028,689 | Saxby | Jan. 21, 1936 |
| 2,492,078 | Welch | Dec. 20, 1949 |
| 2,516,606 | Weaver et al. | July 25, 1950 |

FOREIGN PATENTS

| | | |
|---|---|---|
| 202,815 | Great Britain | Aug. 30, 1923 |
| 242,241 | Switzerland | Sept. 16, 1946 |